Aug. 28, 1923.
J. GRAHAM
GAUGE
Filed Sept. 12, 1921
1,466,043
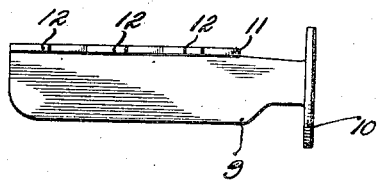
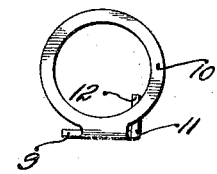
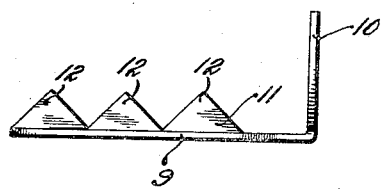
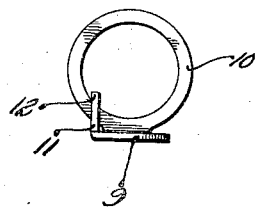
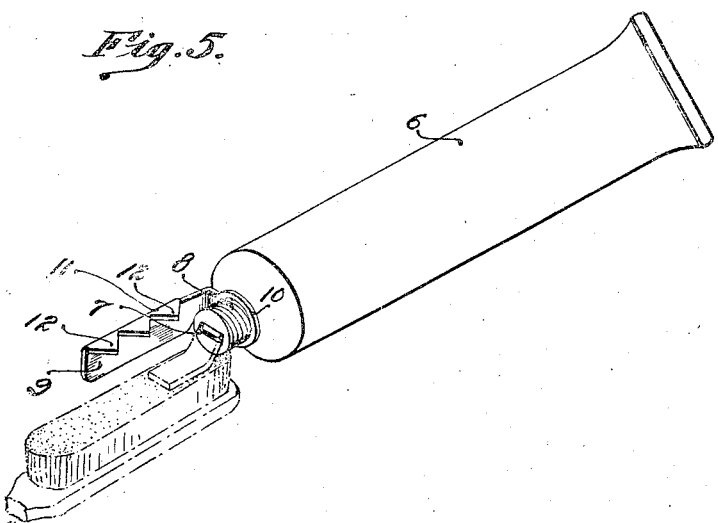

Patented Aug. 28, 1923.

1,466,043

UNITED STATES PATENT OFFICE.

JOHN GRAHAM, OF CHESTER, PENNSYLVANIA.

GAUGE.

Application filed September 12, 1921. Serial No. 500,082.

*To all whom it may concern:*

Be it known that I, JOHN GRAHAM, a citizen of the United States, residing at Chester, in the county of Delaware and State of Pennsylvania, have invented certain new and useful Improvements in Gauges, of which the following is a specification.

One object of my invention is to provide an improved gauge which can be used in connection with collapsible tubes which are used for dispensing plastic material such for example as ointments, tooth paste or the like; the device being so constructed that it will serve as a gauge to allow measured quantities of the plastic material to be dispensed from the tube so that a person can accurately determine and use prescribed amounts of the plastic material.

Another object is to make the device of my invention of a simple and durable construction so that it can be readily attached to the well known form of dispensing tube. These objects, and other advantageous ends which will be described hereinafter, I attain in the following manner, reference being had to the accompanying drawings in which Figure 1 is a side face view of a gauge made in accordance with my invention and illustrated on an enlarged scale, Figure 2 is a rear end elevation of said gauge, Figure 3 is an inverted plan of said gauge, Figure 4 is a rear view of Figure 3, and Figure 5 is a perspective view showing the gauge attached to a tube and illustrating in dot-and-dash lines plastic material having been dispensed from the tube on a brush.

Referring to the drawing, 6 represents a tube which when compressed causes the material therein to be forced out of an opening 7 in the screw threaded stem 8 of the tube.

This tube and stem can be of the ordinary construction. My improved gauge may be made from pressed and cut sheet metal and includes an elongated side 9 which terminates at one end in a ring 10; said ring preferably extending in a plane at right angles to the side 9. The internal diameter of the ring 10 is such that it may be screwed on the threaded stem 8 of the tube 6 so that the side portion 9 will extend beyond the threaded stem 8. The side 9 has a laterally extending serrated or notched flange 11 at its top so as to provide a number of inwardly projecting lugs or points 12 which are spaced apart in the direction of the length of the side 9 and at various distances from the opening 7. These points 12 constitute gauge points for determining the length of plastic material squeezed out of the tube 6 through the opening 7 so that if it is desired for example to use one-half inch of paste or plastic material and the first or nearest point 12 has its point one-half inch from the opening 7, the plastic material can be squeezed out of the tube until the outer end thereof registers with the nearest point 12. If a greater amount is desired the tube can be squeezed until the paste reaches the second point 12 and so on definite amounts of the plastic material can be used from time to time according to prescribed directions.

The points 12 form graduations and thus enable the dispensing of predetermined quantities of the plastic material from the tube, such for example as upon a brush as shown in Figure 5.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claim.

While I have described my invention, what I claim as new and desire to secure by Letters Patent is:—

A gauge consisting of a ring adapted for detachable connection with a dispensing tube, a gauge plate connected to the ring and extending at right angles to the plane of the ring, said plate being provided with points spaced predetermined distances from the plane of the ring whereby the discharge from the tube may be gauged.

In testimony whereof I have signed my name to this specification in the presence of two subscribing witnesses.

JOHN GRAHAM.

Witnesses:
CHAS. E. POTTS,
ELIZABETH GARBE.